(12) United States Patent
Ryan

(10) Patent No.: US 12,303,951 B2
(45) Date of Patent: May 20, 2025

(54) TREATMENT OF WASTE MATERIAL

(71) Applicant: POWERHOUSE ENERGY GROUP PLC, Bridgend (GB)

(72) Inventor: David Ryan, Bridgend (GB)

(73) Assignee: POWERHOUSE ENERGY GROUP PLC, Bridgend (GB)

( * ) Notice: Subject to any disclaimer, the term of this patent is extended or adjusted under 35 U.S.C. 154(b) by 608 days.

(21) Appl. No.: 17/628,018

(22) PCT Filed: Jul. 20, 2020

(86) PCT No.: PCT/GB2020/051730
§ 371 (c)(1),
(2) Date: Jan. 18, 2022

(87) PCT Pub. No.: WO2021/009518
PCT Pub. Date: Jan. 21, 2021

(65) Prior Publication Data
US 2022/0258219 A1    Aug. 18, 2022

(30) Foreign Application Priority Data
Jul. 18, 2019 (GB) .................................. 1910311

(51) Int. Cl.
*B09B 3/45* (2022.01)
*C10J 1/00* (2006.01)
*F23L 7/00* (2006.01)

(52) U.S. Cl.
CPC ............... *B09B 3/45* (2022.01); *F23L 7/005* (2013.01); *C10J 1/00* (2013.01)

(58) Field of Classification Search
None
See application file for complete search history.

(56) References Cited

U.S. PATENT DOCUMENTS

| | | |
|---|---|---|
| 3,049,168 A | 8/1962 | Litwinoff |
| 3,593,923 A | 7/1971 | Soliterman |
| 4,046,085 A | 9/1977 | Barry et al. |
| 4,215,637 A | 8/1980 | Lombana |
| 4,750,437 A | 6/1988 | Rouse |

(Continued)

FOREIGN PATENT DOCUMENTS

| | | |
|---|---|---|
| BE | 1008556 A3 | 6/1996 |
| CA | 2576355 A1 | 7/2008 |

(Continued)

OTHER PUBLICATIONS

English abstract of JP2011094818A.

(Continued)

*Primary Examiner* — David J Laux
(74) *Attorney, Agent, or Firm* — Caesar Rivise, PC

(57) ABSTRACT

A method of treating comminuted waste material, the method comprises: a) feeding comminuted waste material into a heating chamber (28); b) introducing steam into the heating chamber (28); c) contacting the steam and comminuted waste material; d) heating the steam and comminuted waste material to generate a combustible gas; and e) altering or controlling the ratio of steam to comminuted waste material such that the generated combustible gas comprises a target amount (e.g. value or percentage) of a component thereof.

20 Claims, 10 Drawing Sheets

(56) References Cited

U.S. PATENT DOCUMENTS

| | | | |
|---|---|---|---|
| 5,390,630 A * | 2/1995 | Virr | C10K 1/024 122/4 D |
| 6,221,329 B1 | 4/2001 | Faulkner et al. | |
| 6,269,286 B1 | 7/2001 | Tse et al. | |
| 6,332,909 B1 | 12/2001 | Teshima et al. | |
| 6,367,395 B1 | 4/2002 | Masek | |
| 6,837,910 B1 | 1/2005 | Yoshikawa et al. | |
| 9,505,999 B1 * | 11/2016 | Peng | C10K 3/04 |
| 9,885,478 B1 | 2/2018 | May et al. | |
| 2003/0019736 A1 | 1/2003 | Garman | |
| 2003/0037714 A1 | 2/2003 | Tetsomoto et al. | |
| 2004/0197239 A1 | 10/2004 | Mirkovic et al. | |
| 2005/0031516 A1 | 2/2005 | Marty et al. | |
| 2006/0112639 A1 | 6/2006 | Nick et al. | |
| 2006/0228294 A1 | 10/2006 | Davis et al. | |
| 2007/0289509 A1 | 12/2007 | Vera | |
| 2009/0241420 A1 | 10/2009 | Rokhvarger et al. | |
| 2009/0314622 A1 * | 12/2009 | Joo | C10G 1/10 202/117 |
| 2010/0135851 A1 * | 6/2010 | Michalek | A61L 2/07 422/26 |
| 2010/0139534 A1 | 6/2010 | Tsantrizos | |
| 2010/0156104 A1 | 6/2010 | Bottinelli | |
| 2010/0163396 A1 | 7/2010 | Michalek et al. | |
| 2010/0269411 A1 | 10/2010 | Goetsch et al. | |
| 2011/0104575 A1 * | 5/2011 | Mui | C01B 3/36 48/197 R |
| 2011/0201699 A1 | 8/2011 | Lucas et al. | |
| 2011/0266500 A1 * | 11/2011 | Schubert | C10J 3/723 422/198 |
| 2012/0204971 A1 | 8/2012 | Wu et al. | |
| 2013/0240343 A1 | 9/2013 | Wolfe | |
| 2013/0327257 A1 | 12/2013 | Kawai et al. | |
| 2014/0004471 A1 | 1/2014 | Vandergriendt et al. | |
| 2014/0166465 A1 | 6/2014 | Varma | |
| 2014/0227142 A1 * | 8/2014 | Chung | B01J 8/245 422/139 |
| 2014/0332724 A1 * | 11/2014 | Tsangaris | C01B 3/22 422/643 |
| 2015/0291897 A1 | 10/2015 | Blevins et al. | |
| 2016/0194232 A1 | 7/2016 | Ravikumar et al. | |
| 2016/0194262 A1 | 7/2016 | Ravikumar et al. | |
| 2017/0275542 A1 | 9/2017 | Rehmat | |
| 2019/0119588 A1 | 4/2019 | O'Grady | |
| 2021/0308644 A1 | 10/2021 | Carriera | |
| 2023/0312385 A1 | 10/2023 | Nilsen et al. | |

FOREIGN PATENT DOCUMENTS

| | | |
|---|---|---|
| CA | 2944577 A1 | 10/2015 |
| CN | H11304129 A | 11/1999 |
| CN | 201396766 Y | 2/2010 |
| CN | 208108124 U | 11/2018 |
| EP | 1108955 A1 | 6/2001 |
| EP | 2737928 A1 | 6/2014 |
| EP | 3193084 A1 | 7/2017 |
| GB | 2477422 A | 8/2011 |
| GB | 2499404 A | 8/2013 |
| JP | 2003113381 A | 4/2003 |
| JP | 2004163070 A | 6/2004 |
| JP | 2006083310 A | 3/2006 |
| JP | 2007092003 A | 4/2007 |
| JP | 4616923 B1 | 1/2011 |
| JP | 2011094818 A | 5/2011 |
| JP | 2015512972 A | 4/2015 |
| JP | 2017517468 A | 6/2017 |
| JP | 2005351562 A | 12/2022 |
| JP | 2001200093 A | 1/2024 |
| JP | 2003302026 A | 10/2024 |
| KR | 20060017963 A | 2/2006 |
| WO | WO03/095072 A1 | 11/2003 |
| WO | WO2005/093323 A1 | 10/2005 |

OTHER PUBLICATIONS

Examination Report for related Great Britain Patent Application No. GB1910309.2 dated Apr. 3, 2023.
English abstract of JP4616923B1.
English abstact of JP2004163070A.
English abstract of CN201396766Y.
English abstract of BE1008556A3.
English abstract of CN208108124U.
English abstract of JPH11304129A.
Abstract Luo et al., "Syngas Production by Catalytic Steam Gasification of Municipal Solid Waste in Fixed-Bed Reactor", Energy, vol. 44, No. 1, pp. 391-395 (2012).
International Search Report for related PCT Application No. PCT/GB2020/051730 dated Jan. 12, 2021.
International Search Report for related PCT Application No. PCT/GB2020/051731 dated Nov. 3, 2020.
International Search Report for related PCT Application No. PCT/GB2020/051732 dated Nov. 3, 2020.
Search Report for related Great Britain Patent Application No. GB1910309.2 dated Jan. 28, 2020.
Search Report for related Great Britain Patent Application No. GB1910311.8 dated Jan. 28, 2020.
Search Report for related Great Britain Patent Application No. GB1910313.4 dated Jan. 28, 2020.
English abstract of JP2001200093A.
English abstract of JP2007092003A.
English abstract of JP2005351562A.
English abstract of JP2003302026A.
English abstract of JP2015512972A.

* cited by examiner

TREATMENT OF WASTE MATERIAL

CROSS REFERENCE TO RELATED APPLICATIONS

This United States national phase application claims the benefit under 35 U.S.C. § 371 of PCT Application No. PCT/GB2020/051730, filed on Jul. 20, 2020, which in turn claims priority to British Application Serial No. GB 1910311.8, filed on Jul. 18, 2019, and all of whose entire disclosures are incorporated by reference herein.

BACKGROUND OF THE INVENTION

This invention relates generally to a method of treating waste material and to an apparatus for treating waste material. More specifically, although not exclusively, the invention relates to a method of treating comminuted waste material and to an apparatus for treating comminuted waste material.

It is known to heat biomass materials to generate synthesis gas. Synthesis gas is a gaseous mixture comprising hydrogen, carbon monoxide and methane, amongst other substances. The treatment process typically entails heating granulated or otherwise comminuted biomass waste material within a kiln. The kiln is generally heated by a heating system. It is also known to add steam to the contents of the kiln, for example to provide a reducing atmosphere within which synthesis gas may be more readily generated and/or the ratio of constituents of the synthesis gas may be controlled. The steam is typically pre-generated by heating water using a further heating system, prior to introduction of the steam into the kiln. The generated synthesis gas can then be sent on for further treatment.

As will be appreciated by one skilled in the art, the apparatus for generating synthesis gas (and for its further processing) is relatively complex. Furthermore, the treatment process is typically run continuously, for example 24 hours a day. Accordingly, the heating system, compression systems and the like require a relatively large quantity of energy. These relatively high energy requirements may result in relatively high operating costs for such apparatus. However, in order for hydrogen (for example) generated from biomass waste material to be economically competitive with hydrogen generated from other sources, the treatment method must necessarily be as inexpensive as possible. Accordingly, it would be advantageous to minimise the running costs of such apparatus for treating waste material.

It would also be beneficial to increase the efficiency of the method, for example relative to prior art methods. It would be beneficial to provide a relative increase in efficiency of the kiln heating method, of the steam production method, of the gasification process and/or of the production of a component of a generated gas (e.g. hydrogen).

In recent years the proliferation of plastic products and packaging has generated (and continues to generate) large volumes of waste material. Plastics waste material has traditionally been delivered to landfill, for natural decomposition. However, such plastics waste material may take a long time to naturally decompose, for example in the order of many hundreds of years. Accordingly, it has been proposed to treat waste plastics material instead of delivering it to landfill, such that by-products of the treated waste may find use. It would be convenient to separate and recycle plastics materials so that they can be re-processed to produce useful products.

Unfortunately, recycling and recycling technologies are not universal with regards to plastics wastes materials. Further, it is relatively expensive and challenging to process contaminated waste plastics materials, or mixed plastics waste streams. Indeed, there are some plastics materials which currently impossible (or prohibitively expensive) to recycle. Unfortunately, where a waste stream is contaminated it tends to prove too expensive to separate out the recyclable plastics materials from those which are not recyclable and so the entire waste stream may not be processed.

Plastics packaging is a major source of plastics materials which are difficult to recycle, typically because of the functional properties of the plastics, e.g. plastics barrier films used in food packaging. Tyres are another difficult-to-process waste material.

In the circumstance where the waste stream cannot be recycled, the waste stream will typically be diverted to landfill.

BRIEF SUMMARY OF THE INVENTION

It is an object of the current invention to provide ways in which useful work can be extracted from plastics waste materials for example mixed and or contaminated waste plastics materials and vehicle tyres Accordingly, a first aspect of the invention provides a method of treating comminuted waste material, the method comprising:
  a) contacting steam and comminuted waste material in a heating chamber;
  b) heating the steam and comminuted waste material to generate a combustible gas; and
  c) altering or controlling the ratio of steam to comminuted waste material such that the generated combustible gas comprises a target amount (e.g. value or percentage) of a component thereof ($C_T$).

The term 'comminuted' as used herein means a substance which has been reduced to small particles or fragments.

The method may further comprise the step a') of feeding comminuted waste material into the heating chamber. The method may further comprise the step a") of introducing (e.g. injecting) steam into the heating chamber. The step a') may occur before, after or simultaneously with (i.e. at the same time or overlapping with) the step a").

Another aspect of the invention provides a method of treating comminuted waste material, the method comprising:
  a) feeding comminuted waste material into a heating chamber;
  b) introducing (e.g. injecting) steam into the heating chamber;
  c) contacting the steam and comminuted waste material;
  d) heating the steam and comminuted waste material to generate a combustible gas; and
  e) altering or controlling the ratio of steam to comminuted waste material such that the generated combustible gas comprises a target amount (e.g. value or percentage) of a component thereof.

The method may further comprise the preceding step of heating steam (e.g. superheating steam).

The method may comprise a step f) of altering or controlling the location in in the heating chamber to which steam is introduced.

The steam may be generated and/or heated in a steam generator or heat exchanger (e.g. a boiler). The steam may be generated and/or heated by recovered heat. Excess heat (e.g. flue gas) from heating the heating chamber may be supplied to the steam generator or heat exchanger. Steam or water may be supplied to the heat exchanger. The flow rate of steam or water supplied to the heat exchanger may be monitorable or monitored. The flow rate of steam or water supplied to the heat exchanger may be controlled or controllable. Heating of the steam or water may be via heat reclaimed from heating the steam and comminuted waste material in the heating chamber. The flow rate of steam introduced to the heating chamber may be monitored or monitorable. The flow rate of steam introduced to the heating chamber may be controlled or controllable.

The temperature of steam introduced into the heating chamber may be monitored or monitorable. The temperature of steam introduced into the heating chamber may be controlled or controllable. The amount of heat supplied to the heat exchanger may be controlled or controllable. The amount of heat supplied to the heat exchanger may be altered or alterable to control the temperature of the steam introduced to the heating chamber.

Steam may be introduced to the heating chamber continuously or non continuously, e.g intermittently (e.g. pulsed).

The temperature and/or flow rate of steam introduced to the heating chamber may be controlled or controllable such that the generated combustible gas comprises a target amount (e.g. value or percentage) of a component thereof.

In embodiments, altering or controlling the ratio of steam to comminuted waste material may comprise adjusting (e.g. increasing or decreasing) the amount (e.g. mass flow rate) of steam, for example introduced into the heating chamber.

In embodiments, altering or controlling the ratio of steam to comminuted waste material may comprise increasing or decreasing the amount (e.g. mass flow rate) of comminuted waste material, for example fed into the heating chamber.

In embodiments, altering or controlling the ratio of steam to comminuted waste material may comprise adjusting (e.g. increasing or decreasing) the amount (e.g. mass flow rate) of steam, for example, introduced into the heating chamber and/or increasing or decreasing the amount (e.g. mass flow rate) of comminuted waste material, for example fed into the heating chamber.

In embodiments, the method may comprise manually or automatically (e.g. at least partially) altering or controlling the ratio of steam to comminuted waste material. In embodiments, adjusting (e.g. increasing or decreasing) the amount (e.g. mass flow rate) of steam may be achieved automatically or manually (e.g. by an operator). In embodiments increasing or decreasing the amount (e.g. mass flow rate) of comminuted waste material may be achieved automatically or manually (e.g. by an operator).

In embodiments, the method may comprise monitoring or determining the amount (e.g. mass flow rate) of steam introduced into the heating chamber.

In embodiments, the method may comprise comparing the monitored or determined amount (e.g. mass flow rate) of steam ($S_M$) introduced into the heating chamber with a steam target amount ($S_T$).

In embodiments, the steam target amount ($S_T$) may be set prior to step a), b), and/or c) of the method. In embodiments, the steam target amount ($S_T$) may be set simultaneously with (e.g. at least partially) with one or more of steps a), b), and c) of the method. In embodiments, the steam target amount ($S_T$) may be fixed, for example may be set only once during or for use of the method. Alternatively, the steam target amount ($S_T$) may be dynamic, for example the steam target amount ($S_T$) may be changed at one or more times (e.g. simultaneous with one or more step of the method). In embodiments, the steam target amount ($S_T$) may be set according to an operating schedule. For example, the steam target amount ($S_T$) may be set or changed according to one or more outside factors. In embodiments, the one or more outside factors may comprise a decision to generate relatively greater amounts of one or more component of the generated combustible gas (for example a relatively greater amount of hydrogen).

In embodiments, the steam target amount ($S_T$) may be set manually (e.g. at least partially), for example by an operator. In embodiments, the steam target amount ($S_T$) may be set automatically (e.g. at least partially). In embodiments the steam target amount ($S_T$) may set remotely, e.g. from a location remote from the heating chamber. In embodiments, the steam target amount ($S_T$) may be set locally, e.g. locally to the heating chamber (for example at a location adjacent or directly adjacent the heating chamber).

In embodiments altering or controlling the ratio of steam to comminuted waste material may comprise adjusting (e.g. automatically) the amount of steam introduced into the heating chamber, for example to maintain the amount at or about or within the steam target amount ($S_T$).

In embodiments, the method may comprise monitoring or determining the amount (e.g. mass flow rate) of comminuted waste material fed into the heating chamber.

In embodiments, the method may comprise comparing the monitored or determined amount (e.g. mass flow rate) of comminuted waste material ($W_M$) fed into the heating chamber with a waste material target amount ($W_T$).

In embodiments, the amount (e.g. mass flow rate) of comminuted waste material fed into the heating chamber may be monitored remotely, e.g. from a location remote to the heating chamber. In embodiments, the amount (e.g. mass flow rate) of steam introduced into the heating chamber may be monitored remotely, e.g. from a location remote to the heating chamber. In embodiments, the waste material target amount ($W_T$) may be set prior to step a), b), and/or c) of the method. In embodiments, the waste material target amount ($W_T$) may be set simultaneously with (e.g. at least partially) with one or more of steps a), b), and c) of the method. In embodiments, the waste material target amount ($W_T$) may be fixed, for example may be set only once during or for use of the method. Alternatively, the waste material target amount ($W_T$) may be dynamic, for example the waste material target amount ($W_T$) may be changed at one or more times (e.g. simultaneous with one or more step of the method). In embodiments, the waste material target amount ($W_T$) may be set according to an operating schedule. For example, the waste material target amount ($W_T$) may be set or changed according to one or more outside factors. In embodiments, the one or more outside factors may comprise a decision to generate relatively greater amounts of one or more component of the generated combustible gas (for example a relatively greater amount of hydrogen).

In embodiments, the waste material target amount ($W_T$) may be set manually (e.g. at least partially), for example by an operator. In embodiments, the waste material target amount ($W_T$) may be set automatically (e.g. at least partially). In embodiments the waste material target amount ($W_T$) may set remotely, e.g. from a location remote from the heating chamber. In embodiments, the waste material target amount ($W_T$) may be set locally, e.g. locally to the heating chamber (for example at a location adjacent or directly adjacent the heating chamber).

In embodiments, the waste material target amount ($W_T$) may be set according to an operating schedule.

In embodiments, altering or controlling the ratio of steam to comminuted waste material may comprise adjusting (e.g. automatically) the amount of comminuted waste material fed into the heating chamber, for example to maintain the amount at or about or within the waste material target amount ($W_T$).

In embodiments, the component may be one or more of hydrogen, methane or a further combustible gas.

In embodiments, the method may comprise a step d) of setting the target amount ($C_T$) (e.g. value or percentage). In embodiments, the target amount ($C_T$) may comprise a range of values or percentages. Alternatively, the target amount may comprise a value or percentage.

In embodiments, the steam and comminuted waste material may be contacted initially at least partially outside the heating chamber, for example the steam and comminuted waste material may be contacted before steps a') and a").

In embodiments, the target amount ($C_T$) may be set prior to step a), b), c), of the method. In embodiments, the target amount may be set simultaneously with (e.g. at least partially) with one or more of steps a), b), c) of the method. In embodiments, the target amount may be fixed, for example may be set only once during or for use of the method. Alternatively, the target amount ($C_T$) may be dynamic, for example the target amount ($C_T$) may be changed at one or more times (e.g. simultaneous with one or more step of the method). In embodiments, the target amount ($C_T$) may be set according to an operating schedule. For example, the target amount ($C_T$) may be set or changed according to one or more outside factors. In embodiments, the one or more outside factors may comprise a decision to generate relatively greater amounts of one or more component of the generated combustible gas (for example a relatively greater amount of hydrogen).

In embodiments, the target amount ($C_T$) may be set manually (e.g. at least partially), for example by an operator. In embodiments, the target amount may be set automatically (e.g. at least partially). In embodiments the target amount ($C_T$) may be set remotely, e.g. from a location remote from the heating chamber. In embodiments, the target amount ($C_T$) may be set locally, e.g. locally to the heating chamber (for example at a location adjacent or directly adjacent the heating chamber).

In embodiments, contacting the steam and comminuted waste material may comprise mixing (e.g. at least partially) of the steam and comminuted waste material. Mixing may be active (for example may be at least partially accomplished by way of a mixing means or mixer) or passive (for example may be at least partially a consequence of contact between the steam and comminuted waste material).

In some embodiments, the method may comprise a step of cleaning the generated combustible gas.

In embodiments, the heating chamber may be rotatable (e.g. rotatable about an axis of rotation), in use. The method may comprise a step of rotating the heating chamber. Steam may be introduced offset from the axis of rotation.

The steam may be introduced at a temperature of between about 400 and 800° C., for example between about 500 and 700° C., say between about 550 and 650° C., e.g. approximately 600° C.

In some embodiments, the method may comprise further processing the generated combustible gas. The further processing may comprise removing or separating out one or more components of the generated combustible gas, for example removing or separating out hydrogen from the generated combustible gas.

The comminuted waste material may comprise plastics waste, for example polyethylene terephthalate, high-density polyethylene, low-density polyethylene, linear low-density polyethylene, polyvinylchloride, polypropylene, or the like. The comminuted waste material may comprise rubber, biomass, tyre crumbs or the like. The comminuted waste material may comprise any suitable combination of plastics and or of other materials.

The combustible gas may comprise a combustible hydrocarbon, for example methane or another alkane. The combustible gas may form a component of a gaseous mixture, e.g. a generated gaseous mixture. The gaseous mixture may comprise synthesis gas. The synthesis gas may comprise hydrogen, methane, carbon monoxide. The synthesis gas may comprise one or more further substances.

In embodiments, the method may comprise a step of supplying at least a portion of the generated combustible gas to a generator, for example for generating electrical energy. The generator may supply electrical energy to control or operate one or more component or machine associated with the steps of the method. Additionally or alternatively, the generator may supply electrical energy to the or a electricity grid. Additionally or alternatively, the generator may supply electrical energy to one or more further component or machine.

In embodiments, at least a portion of the generated combustible gas may be sent or supplied to a gas grid. In embodiments, at least a portion of the generated combustible gas may be processed into one or more further chemicals. In embodiments, the or a component or at least a portion of the generated combustible gas may be stored, for example in a storage means or storage system (e.g. such as a storage tank). In embodiments, the stored component or portion of the generated combustible gas may be further processed.

The method may be a continuous or non-continuous method. For example, one or more of the steps of the method may occur at least partially simultaneously with one or more of the other steps of the method. In embodiments, one, some or each of the steps of the method may occur continuously or non-continuously.

The step of contacting the comminuted waste material with steam may comprise contacting the comminuted waste material with superheated steam, the steam may be heated to a temperature of above 200° C., for example, above 300, 400 or 500° C.

In embodiments, the step of altering or controlling the ratio of steam to comminuted waste material may comprise a feed-back loop, for example comprising monitoring or determining and altering or controlling.

A further aspect of the invention provides an apparatus for treating comminuted waste material, the apparatus comprising:

a heating chamber comprising an inlet for feeding of comminuted waste material into the heating chamber, and an outlet for egress of a generated combustible gas from the heating chamber;
  a steam introduction means or steam introduction system for introducing steam into the heating chamber;
  a heating means or heater for heating a mixture of steam and comminuted waste material in the heating chamber, in use, to generate a combustible gas; and
  a controller configured to alter or control, in use, the ratio of steam to comminuted waste material in the heating chamber such that a combustible gas generated therefrom comprises a target amount (e.g. value or percentage) of a component thereof.

The apparatus may comprise an adjustment means or adjuster or lance for altering or controlling the location in the heating chamber to which steam is introduced.

The apparatus may comprise a steam generator or heat exchanger (e.g. a boiler). The steam may be generated or heated in the steam generator or heat exchanger. The steam may be superheated in the steam generator or heat exchanger. Recovered heat may be used to generate and/or heat the steam. Excess heat (e.g. flue gas) from heating the heating chamber may be supplied to the heat exchanger. Steam or water may be supplied to the heat exchanger.

The apparatus may comprise a sensor for monitoring the flow rate of steam or water supplied to the heat exchanger. The apparatus may comprise a valve for controlling the flow rate of steam or water supplied to the heat exchanger. Heating of the steam or water may be via heat reclaimed from heating the steam and comminuted waste material in the heating chamber.

The apparatus may comprise sensors in the heating chamber for monitoring the temperature of steam introduced into the heating chamber. The temperature of steam introduced into the heating chamber may be controlled or controllable. The amount of heat supplied to the heat exchanger may be controlled or controllable. The amount of heat supplied to the heat exchanger may be altered or alterable to control the temperature of the steam introduced to the heating chamber.

The valve may supply steam or water to the heat exchanger intermittently (e.g. pulsed). Steam may be introduced to the heating chamber intermittently (e.g. pulsed).

Steam may be introduced to the heating chamber such that the generated combustible gas comprises a target amount (e.g. value or percentage) of a component thereof (e.g. by controlling the flow rate and/or temperature thereof).

In embodiments, the apparatus may comprise a steam sensing means or steam sensor, for example which may be configured or configurable to monitor the amount (e.g. mass flow rate) of steam (for example introduced into the heating chamber, in use). The steam sensing means or steam sensor may comprise one or more sensors, for example which may be configured or configurable to monitor or measure (e.g. directly or indirectly) the amount (e.g. mass flow rate) of steam (for example into or introduced or injected into the heating chamber). The one or more sensors may comprise a flow sensor.

In embodiments, the controller may be configured to compare an amount (e.g. mass flow rate) of steam introduced ($S_M$) into the heating chamber, in use, measured by the steam sensing means or steam sensor with a steam target amount ($S_T$).

In embodiments, the controller may be configured to adjust (e.g. automatically) the amount of steam introduced into the heating chamber, in use, for example to maintain the amount at or about or within the steam target amount ($S_T$).

In embodiments, the apparatus may comprise a waste material sensing means or material sensor, for example which may be configured or configurable to monitor the amount (e.g. mass flow rate) of comminuted waste material (for example fed into the heating chamber) ($W_M$). The waste material sensing means or waste material sensor may comprise one or more sensors, for example which may be configured or configurable to monitor or measure (e.g. directly or indirectly) the amount (e.g. mass flow rate) of waste material (for example into the heating chamber). The one or more sensors may be configured or configurable to monitor or measure a feed means or feeder arranged or arrangeable to feed comminuted waste material into the heating chamber. Where the feed means or feeder comprises a feed screw the one or more sensors may be configured or configurable to monitor or measure an operating parameter of the feed screw, for example a power (e.g. electrical) applied or consumed thereby and/or an angular velocity of the feed screw. The one or more sensors may comprise an encoder.

In embodiments, the controller may be configured to compare an amount (e.g. mass flow rate) of steam introduced into the heating chamber, in use, with a steam target amount ($S_T$).

In embodiments, the controller may be configured to compare an amount (e.g. mass flow rate) of comminuted waste material fed into the heating chamber, in use, with a waste material target amount ($W_T$).

In embodiments, the controller may be configured to adjust (e.g. automatically) the amount of comminuted waste material fed into the heating chamber, in use, for example to maintain the amount at or about or within the waste material target amount ($W_T$).

The heating means or heater may comprise one or more combustion heating means or combustion heater. The one or more combustion heating means or combustion heater may comprise one or more combustion heaters, for example one or more heaters using a fuel source such as gas. The one or more combustion heating means or combustion heater may comprise one or more gas heaters, e.g. one or more gas burners. In embodiments, the one or more combustion heating means or combustion heater may be located, in use, outside of the heating chamber. The one or more combustion heating means or combustion heater may be arranged to heat the heating chamber.

In embodiments, the one or more combustion heating means or combustion heater comprises plural combustion heating means or combustion heater. A first combustion heating means or combustion heater may be configured or configurable to heat comminuted waste material in a or the first zone of the heating chamber, e.g. to the or a first temperature T1 (where plural zones are defined in the heating chamber). A second combustion heating means or combustion heater may be configured or configurable to heat gasified material in a or the second zone of the heating chamber, e.g. to the second temperature T2. A third combustion heating means or combustion heater may be configured or configurable to heat a third zone of the heating chamber, e.g. to a third temperature T3. In embodiments, the first zone may be at or adjacent the inlet. The third zone may be at or adjacent the outlet. the second zone may be in between the first and third zones.

The first temperature T1 may be sufficiently high to at least partially gasify the comminuted waste material. The first temperature T1 may be sufficiently high to fully gasify the comminuted waste material.

The temperature of the heating chamber may be above 250° C. throughout. For example, the temperature of the heating chamber may be above 250° C., e.g. above 275° C., 300° C., 325° C., 350° C., 375° C., 400° C., 425° C., 450° C., 475° C., 500° C., 525° C., 550° C., 575° C., 600° C., 625° C. or 650° C., in each of the zones, e.g. in each of the three zones.

Steam may be introduced or injected into any one of the three zones. Steam may be introduced to the first zone and/or the second zone and/or the third zone. Steam may be introduced to one or more of the three zones. Steam may be introduced upstream of the first zone (e.g. alongside the comminuted waste material).

In embodiments, the apparatus may comprise a cleaning system, for example for cleaning combustible gas generated in the heating chamber.

In some embodiments, the apparatus may comprise a kiln, for example a rotary kiln. The rotary kiln may be of the direct or indirect type. The heating chamber may be provided or defined within the or a kiln. The heating chamber (e.g. the kiln or a portion thereof) may be arranged or configured to be rotatable, in use. The heating chamber may comprise a thermal conversion chamber.

In some embodiments, the apparatus may comprise a steam delivery means or steam delivery system, for example which may be configured or configurable to introduce steam into the heating chamber. The steam delivery means or steam delivery system may comprise a source of water. The steam delivery means or steam delivery system may comprise a boiler and/or a heat exchanger, for example arranged or arrangeable to boil water (e.g. from the source of water).

The steam delivery means or steam delivery system may comprise a heater or heat exchanger capable of superheating steam, for example a heater capable of heating steam to a temperature in excess of 200° C., for example, above 300, 400 or 500° C.

A further aspect of the invention provides a method of treating comminuted waste material, the method comprising:
a) heating water using one or more combustion heating means or combustion heater to generate steam;
b) introducing the generated steam into a heating chamber;
c) heating comminuted waste material in the presence of the generated steam in the heating chamber to generate a combustible gas; and
d) supplying at least a portion of the combustible gas to the one or more combustion heating means or combustion heater for heating the water.

In embodiments waste heat (for example from a kiln exhaust system) may be fully or partially used to heat water to produce steam.

For the avoidance of doubt, any of the features described herein apply equally to any aspect of the invention. For example, the apparatus may comprise any one or more features of the method relevant to the apparatus and/or the method may comprise any one or more features or steps relevant to one or more features of the apparatus.

A further aspect of the invention provides a computer program element comprising computer readable program code means or computer readable program code system for causing a processor to execute a procedure to implement one or more steps of the aforementioned method.

A yet further aspect of the invention provides the computer program element embodied on a computer readable medium.

A yet further aspect of the invention provides a computer readable medium having a program stored thereon, where the program is arranged to make a computer execute a procedure to implement one or more steps of the aforementioned method.

A yet further aspect of the invention provides a control means or control system or controller comprising the aforementioned computer program element or computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed.

BRIEF DESCRIPTION OF SEVERAL VIEWS OF THE DRAWINGS

Embodiments of the invention will now be described by way of example only with reference to the accompanying drawings in which.

DETAILED DESCRIPTION OF THE PREFERRED EMBODIMENTS

Figure 1:
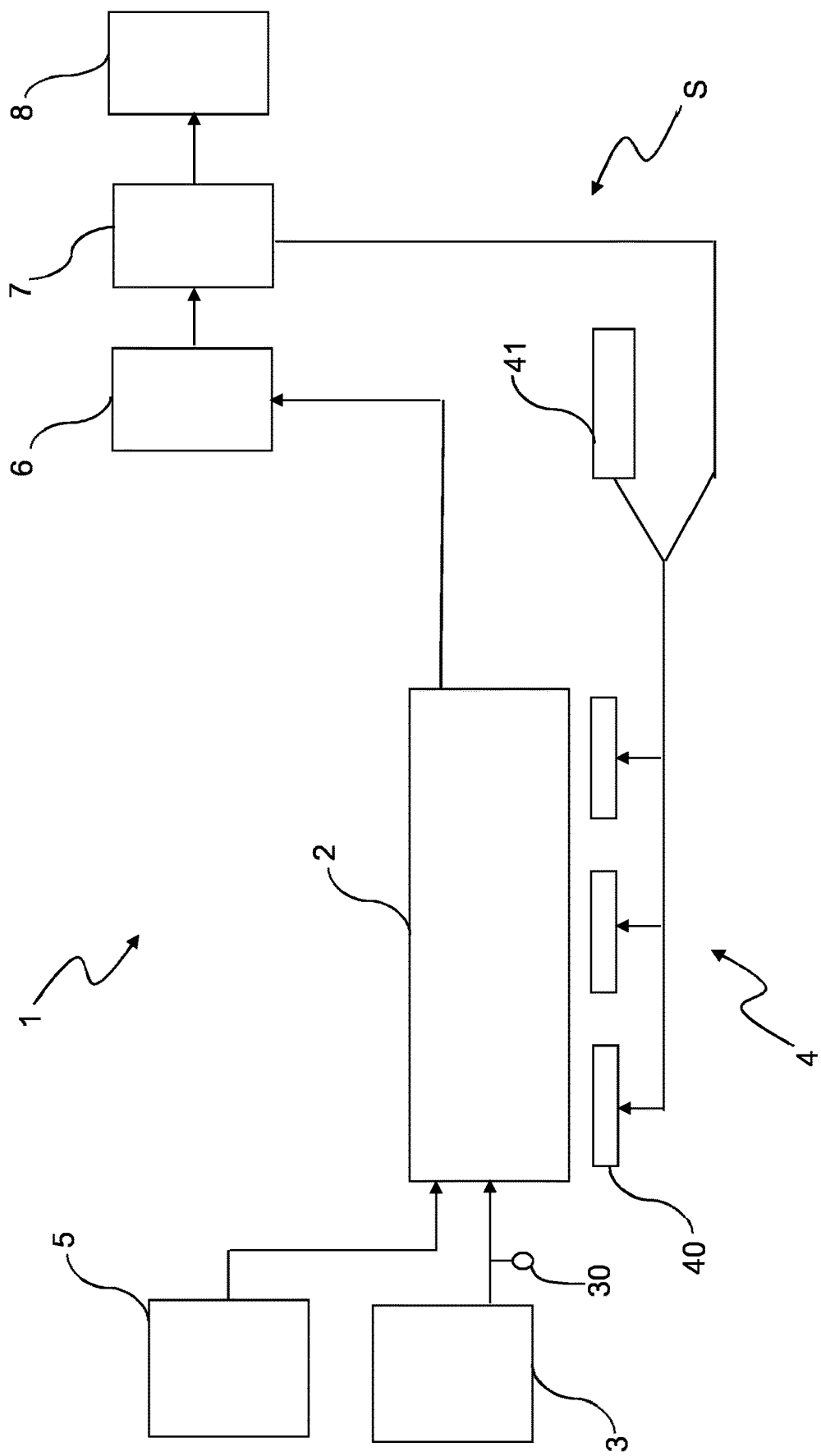
FIG. 1 shows a generalised schematic view of an apparatus for treating comminuted waste material according to an embodiment of the invention.
Figure 2:
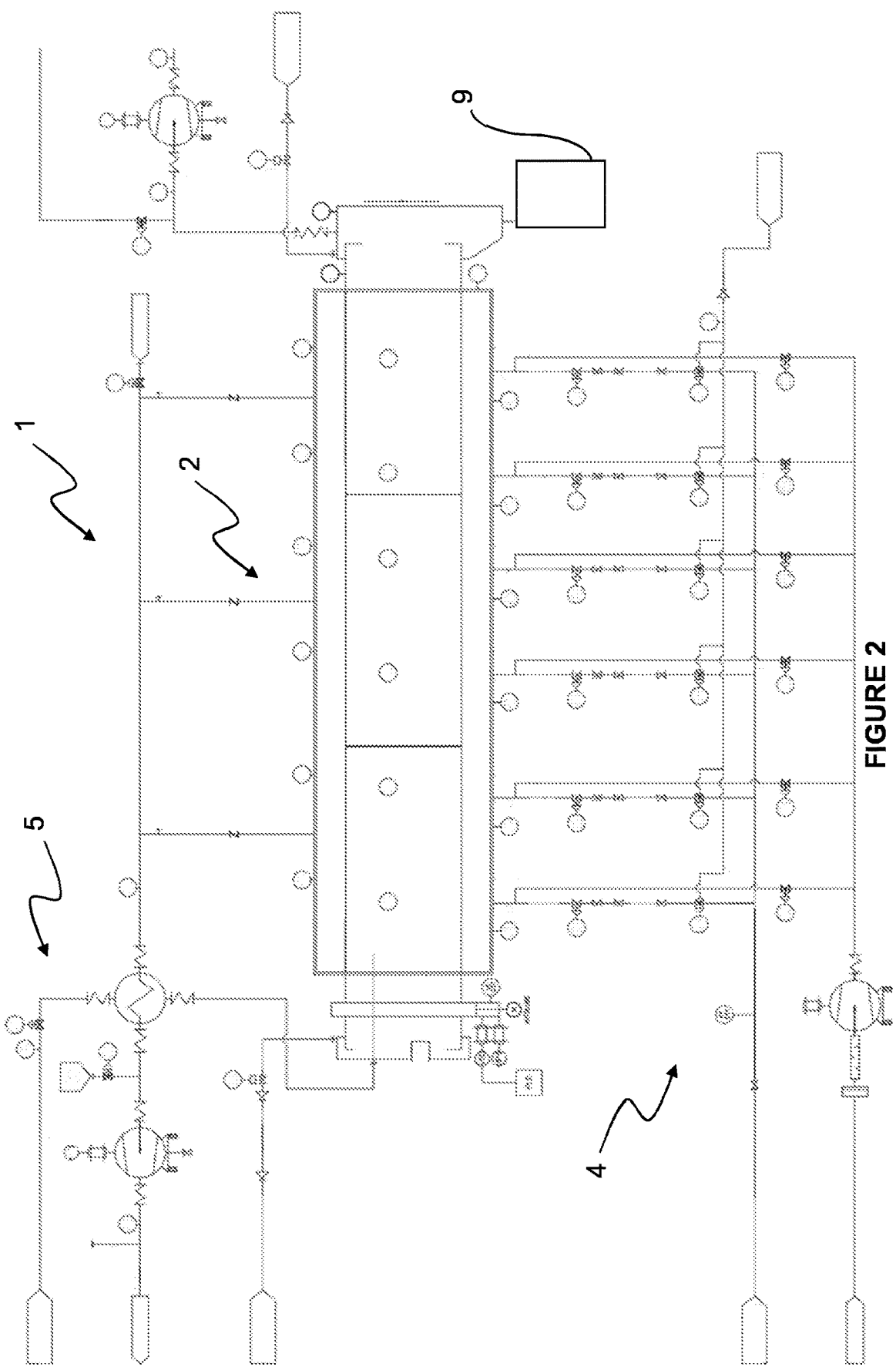
FIG. 2 shows a detailed schematic view of the indirect rotary kiln, heating system and steam system shown in FIG. 1.

Referring now to FIG. 1, there is shown a schematic representation of an apparatus 1 for treating comminuted waste material according to an embodiment of the invention. In use, the apparatus 1 converts waste material feedstock, for example granulated plastics, into syngas (as will be described in greater detail below).

Figure 3:
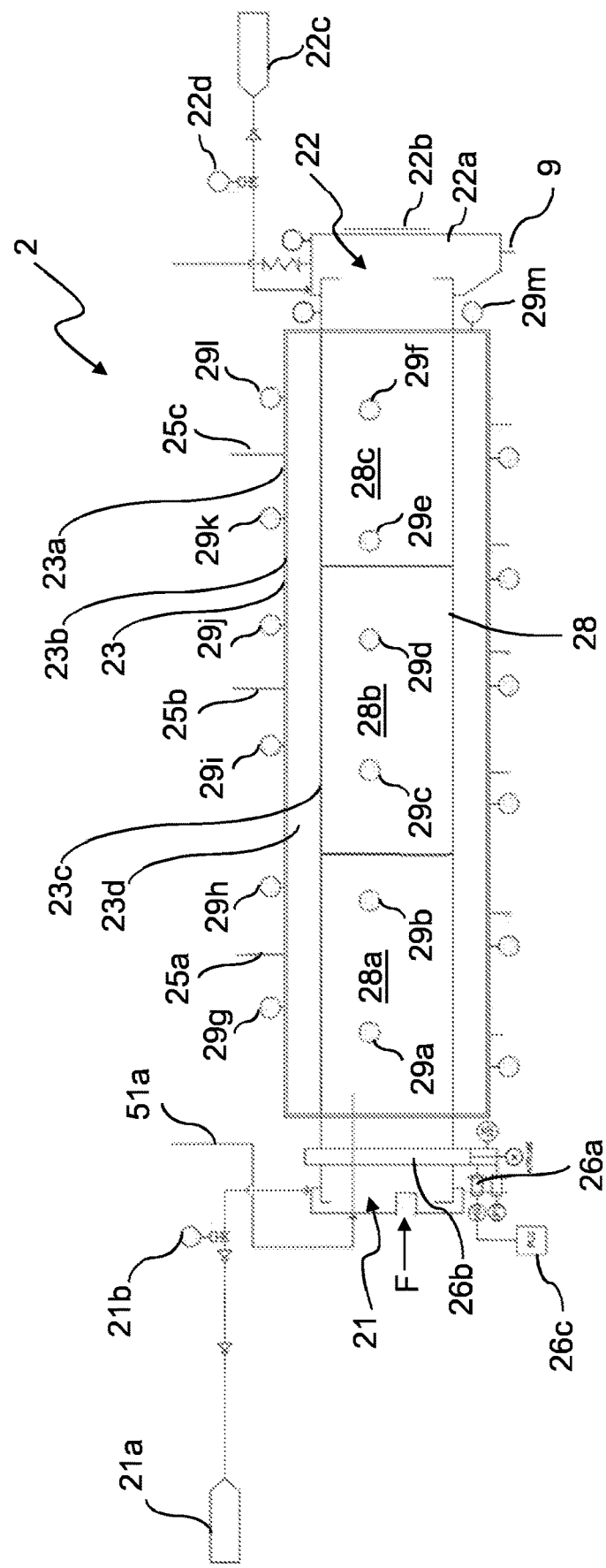
FIG. 3 shows an enlarged view of the indirect rotary kiln shown in FIG. 2.

As shown in FIG. 3, the apparatus 1 comprises a heating chamber 28, which is provided within an indirect rotary kiln 2 in this embodiment. The apparatus 1 further comprises a waste feed system 3, a heating system 4, a steam system 5, a cleaning system 6, a storage system 7 and a further processing system 8. The heating system 4 comprises plural combustion heaters 40. The plural combustion heaters 40 are arranged to heat, in use, the contents of the indirect rotary kiln 2. The waste feed system 3 is arranged to introduce, in use, comminuted waste material into the indirect rotary kiln 2. The steam system 5 is arranged to introduce, in use, steam into the indirect rotary kiln 2. The indirect rotary kiln 2 is fluidly connected to the heating system 4 by a supply system S. The supply system S comprises the cleaning system 6 and the storage system 7 in this embodiment. In embodiments, however, the supply system S may be absent one or each of the cleaning system 6 and the storage system 7.

The cleaning system 6 is arranged to receive, in use, generated synthetic gas from the indirect rotary kiln 2. The storage system 7 is arranged to receive, in use, cleaned synthetic gas from the cleaning system 6. The storage system 7 is arranged to send at least a portion of cleaned synthetic gas to the further processing system 8.

Referring now to FIGS. 2 to 6, there is shown a detailed schematic view of portions of the apparatus for treating comminuted waste material shown in FIG. 1.

As shown in FIG. 3, the indirect rotary kiln 2 comprises an inlet 21 and an outlet 22. The inlet 21 and outlet 22 are disposed at opposite ends of the indirect rotary kiln 2, in this embodiment. The indirect rotary kiln 2 comprises a drum 23. The drum 23 comprises an outer shell 23a. The outer shell 23a surrounds a layer of insulating refractory bricks 23b.

The insulating refractory bricks 23b surround a rotatable tube 23c. The rotatable tube 23c extends beyond the ends of the outer shell 23a on either end. A heating space 23d is defined between the insulating refractory bricks 23b and the rotatable tube 23c. In use, the outer shell 23a and insulating refractory bricks 23b are stationary whilst the rotatable tube 23c is rotated. The rotatable tube 23c may have a diameter of about 1.5 m. The rotatable tube 23c may have a heated length of about 10 m.

The indirect rotary kiln 2 is installed, for use, at an angle relative to the horizontal of approximately 1.5°. The indirect rotary kiln 2 is arranged such that the inlet 21 is relatively higher than is the outlet 22. A variable speed drive motor 26a is provided, which in this embodiment is located adjacent the inlet 21 of the indirect rotary kiln 2. A mechanical drive chain 26b is also provided. The mechanical drive chain 26b links the variable speed drive motor 26a to the rotatable tube 23c. In use, activation of the variable speed drive motor 26a causes the mechanical drive chain 26b to move and, hence causes the rotatable tube 23c to rotate. The rotary kiln 2 is supported on water cooled bearings (not shown). The rotatable tube 23c is sealed using nitrogen purge sprung seals (not shown).

A discharge hood 22a is provided adjacent the outlet 22 of the indirect rotatable kiln 2. The discharge hood 22a is in fluid communication with the outlet 22. An inspection hatch 22b is provided on the discharge hood 22a.

A heating chamber 28 is defined within the rotatable tube 23c. The heating chamber 28 is divided into a first zone 28a, a second zone 28b and a third zone 28c. The first zone 28a is adjacent the inlet 21. the third zone 28c is adjacent the outlet 22. The second zone 28b is provided between the first and second zones 28a, 28c. In this embodiment, each of the zones 28a, 28b, 28c are of approximately equal length and/or volume. In embodiments, however, this need not be the case and one or more of the zones 28a, 28b, 28c may be of different lengths and/or volumes.

The apparatus 1 comprises an array 29 of temperature sensors, in this embodiment. The array 29 comprises temperature sensors 29a, 29b, 29c, 29d, 29e, 29f located inside of the rotatable tube 23c, in this embodiment. Two of the temperature sensors 29a, 29b, 29c, 29d, 29e, 29f located inside of the rotatable tube 23c are located inside each of the zones 28a, 28b, 28c, in this embodiment. The array 29 also comprises temperature sensors 29g, 29h, 29i, 29j, 29k, 29l located in the heating space 23d.

The apparatus comprises a pressure sensor 29m. The pressure sensor 29m is configured or arranged to monitor the pressure in the heating space 23d.

The heating space 23d contains three exhaust vents 25a, 25b, 25c are provided through the outer shell 23a. The exhaust vents 25a, 25b, 25c are in fluid communication with the heating space 23d. One of the exhaust vents 25a, 25b, 25c is located adjacent each of the zones 28a, 28b, 28c of the heating chamber 28, respectively.

The apparatus 1 further comprises a first nitrogen supply 21a. The first nitrogen supply 21a is in fluid communication with the inlet 21 of the indirect rotary kiln 2. The apparatus 1 further comprises a second nitrogen supply 22c. The second nitrogen supply 22c is in fluid communication with the discharge hood 22a. A check valve 21b is provided between the first nitrogen supply 21a and the rotatable tube 23c. A check valve 22d is provided between the second nitrogen supply 22c and the discharge hood 22a.

The feed system 3 comprises a feed screw (not shown) in this embodiment. However, in embodiments the feed system 3 may comprise any suitable means for feeding waste material into the indirect rotary kiln 2, as will be appreciated by one skilled in the art. As shown in FIG. 1, a flow sensor 30 is arranged to monitor the amount (e.g. the mass flow rate) of comminuted waste material into the heating chamber 28.

Figure 4:
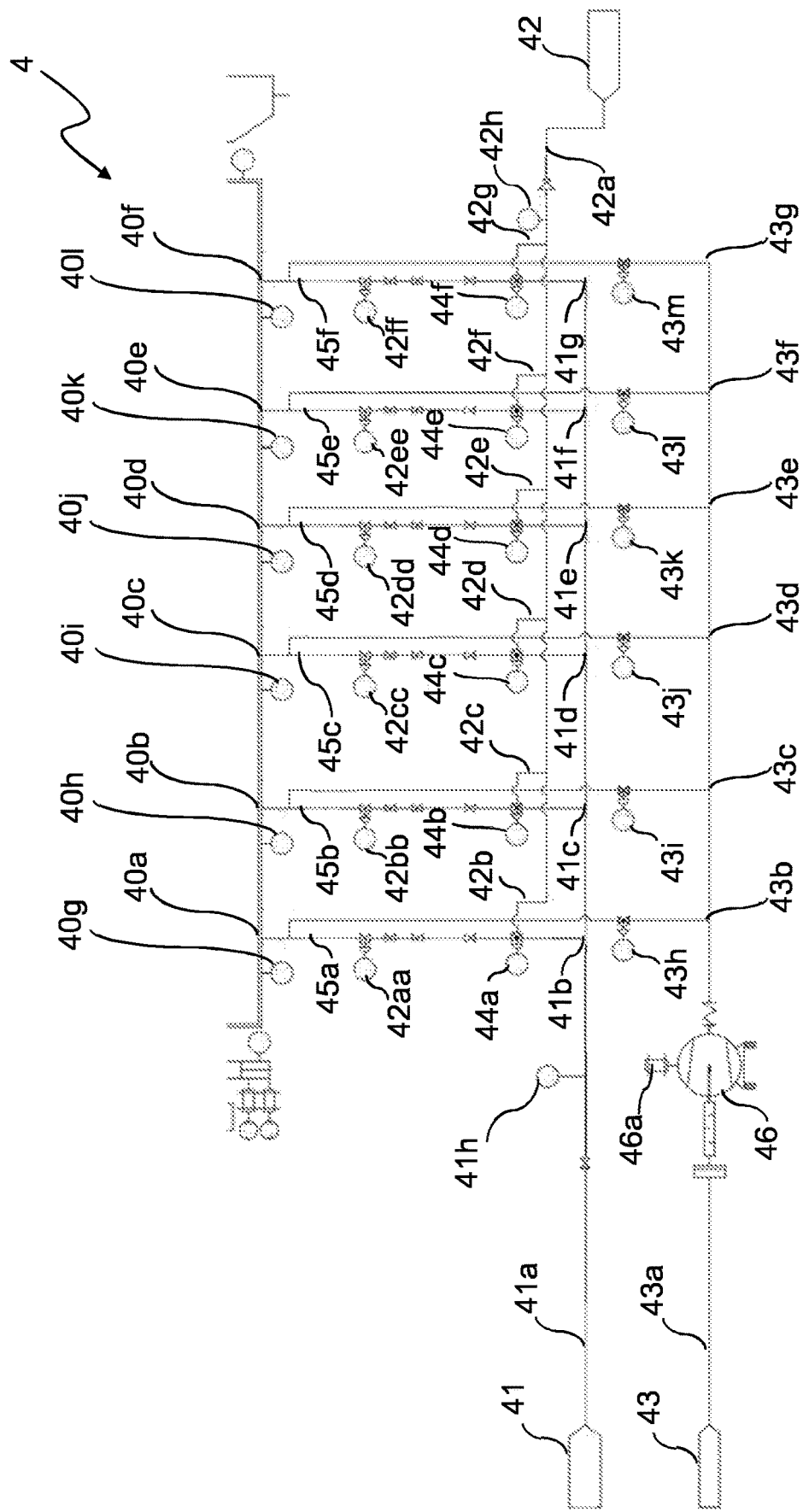
FIG. 4 shows an enlarged view of the heating system shown in FIG. 2.

Referring now to FIG. 4, the heating system 4 comprises plural combustion heaters 40 which are gas burners 40a, 40b, 40c, 40d, 40e, 40f, in this embodiment. The gas burners 40a, 40b, 40c, 40d, 40e, 40f are arranged, in use, to heat the heating space 23d. The gas burners 40a, 40b, 40c, 40d, 40e, 40f are lean burn high efficiency gas burners. The gas burners 40a, 40b, 40c, 40d, 40e, 40f are configured to be individually controllable (as will be described in greater detail later). In this embodiment, two of the gas burners 40a, 40b, 40c, 40d, 40e, 40f are located adjacent each of the zones 28a, 28b, 28c. The gas burners 40a, 40b, 40c, 40d, 40e, 40f are equally spaced along the length of the indirect rotary kiln 2. Each gas burner 40a, 40b, 40c, 40d, 40e, 40f is provided with a respective monitoring device 40g, 40h, 40i, 40j, 40k, 40l. The monitoring devices 40g, 40h, 40i, 40j, 40k, 40l are flame detectors, in this embodiment.

The heating system 4 comprises a natural gas supply 41. The natural gas supply 41 is in fluid communication with gas control valves 44a, 44b, 44c, 44d, 44e, 44f via a natural gas pipeline 41a. The natural gas pipeline 41a has parallel branches 41b, 41c, 41d, 41e, 41f, 41g. On each branch 41b, 41c, 41d, 41e, 41f, 41g there is located a gas control valve 44a, 44b, 44c, 44d, 44e, 44f, respectively. A flow sensor 41h is also provided. The flow sensor 41h is arranged to monitor flow through the natural gas pipeline 41a, e.g. flow between the natural gas supply 41 and the first branch 41b.

The heating system 4 also comprises a synthesis gas supply pipeline 42a in fluid communication with a store of generated synthesis gas 42 (as will be described in greater detail later). The syngas supply pipeline 42a is in fluid communication with the gas control valves 44a, 44b, 44c, 44d, 44e, 44f. The syngas pipeline 42a has parallel branches 42b, 42c, 42d, 42e, 42f, 42g. A pressure sensor 42h is also provided. The pressure sensor 42h is configured to measure or determine the pressure of gas in the syngas pipeline 42a, e.g. between the distal branch 42g and the store 42 of synthesis gas.

The natural gas pipeline 41a is fluidly connected to each gas burner 40a, 40b, 40c, 40d, 40e, 40f by, respectively, a gas pipe 45a, 45b, 45c, 45d, 45e, 45f. The synthesis gas supply pipeline 42a is fluidly connected to each gas burner 40a, 40b, 40c, 40d, 40e, 40f by, respectively, a gas pipe 45a, 45b, 45c, 45d, 45e, 45f. Each gas pipe 45a, 45b, 45c, 45d, 45e, 45f comprises a gas control valve 44a, 44b, 44c, 44d, 44e, 44f. Each gas pipe 45a, 45b, 45c, 45d, 45e, 45f comprises a temperature control valve 42aa, 42bb, 42cc, 42dd, 42ee, 42ff.

Each gas control valve 44a, 44b, 44c, 44d, 44e, 44f is located between the respective branch 41b, 41c, 41d, 41e, 41f, 41g of the natural gas pipeline 41a and the respective gas pipe 45a, 45b, 45c, 45d, 45e, 45f. Each gas control valve 44a, 44b, 44c, 44d, 44e, 44f is located between the respective branch 42b, 42c, 42d, 42e, 42f, 42g of the synthesis gas pipeline 42a and the respective gas pipe 45a, 45b, 45c, 45d, 45e, 45f.

The heating system 4 further comprises a combustion air supply 43. The combustion air supply 43 is in fluid communication with a combustion air fan 46, via a combustion air pipeline 43a. The combustion air fan 46 comprises an electric drive motor 46a. The combustion air pipeline 43 is fluidly connected to each of the gas burners 40a, 40b, 40c, 40d, 40e, 40f, e.g. via branches 43b, 43c, 43d, 43e, 43f, 43g, respectively. An air control valve 43h, 43i, 43j, 43k, 43l, 43m is provided on the line between each gas burner 40a, 40b, 40c, 40d, 40e, 40f and each respective branch 43b, 43c, 43d, 43e, 43f, 43g. Each branch 43b, 43c, 43d, 43e, 43f, 43g of the combustion air pipeline 43 is connected to the respective gas pipe 45a, 45b, 45c, 45d, 45e, 45f between the temperature control valve 42aa, 42bb, 42cc, 42dd, 42ee, 42ff and the gas burner 40a, 40b, 40c, 40d, 40e, 40f.

Figure 5:
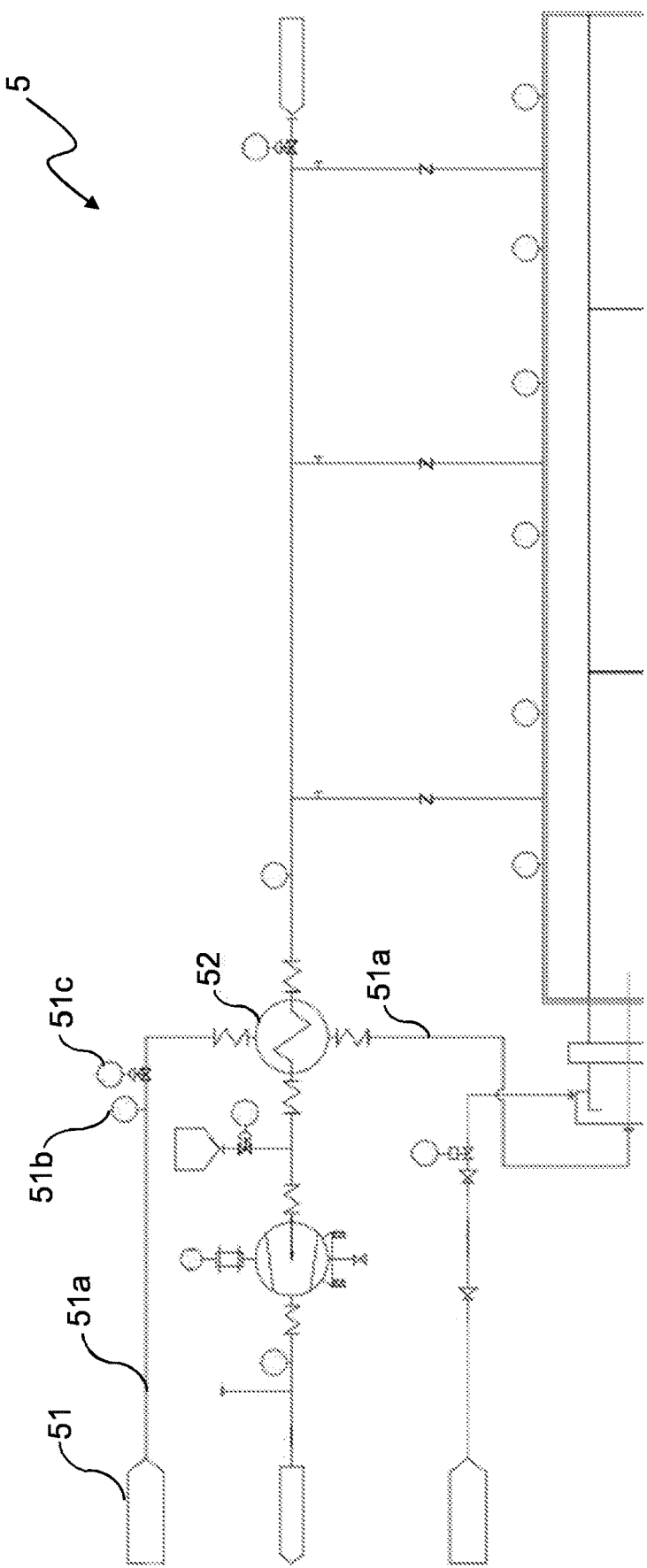
FIG. 5 shows an enlarged view of the steam system shown in FIG. 2.

Referring now to FIG. 5, the steam system 5 is provided with a water source 51. The water source 51 is in fluid communication with a steam superheater 52 via a steam pipeline 51a. A flow sensor 51b is arranged to measure the flow of water from the water source 51 to the steam superheater 52. A flow control valve 51c is located in the steam pipeline 51a. The steam superheater 52 is in fluid communication with the inlet 21 of the rotatable tube 23c via the steam pipeline 51a.

The steam superheater 52 is heated by excess heat from the heating space 23d. The exhaust vents 25a, 25b, 25c are in fluid communication with the superheater 52, to provide the excess heat thereto. The excess heat heats the water to provide superheated steam to the inlet 21 of the rotatable tube 23c.

Figure 6:
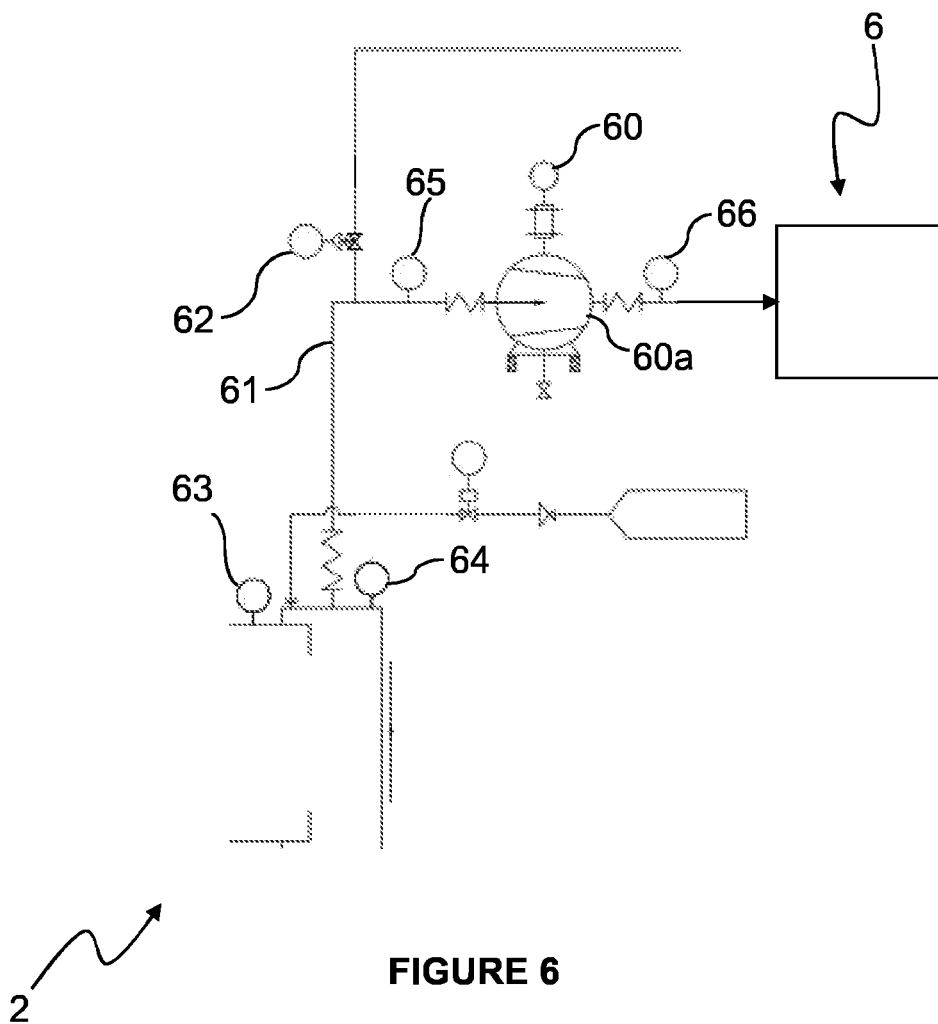
FIG. 6 shows the syngas removal and pressure relief system shown in FIG. 2.

Referring now to FIG. 6, the discharge hood 22a is in fluid communication with a synthesis gas fan 60, e.g. via an outlet pipe 61. The discharge hood 22a is in fluid communication with a pressure control valve 62, e.g. via the outlet pipe 51. The pressure control valve 62 is in fluid communication with the pressure relief system (not shown). The synthesis gas fan 60 is in fluid communication with the cleaning system 6. The synthesis gas fan 60 comprises a variable speed electric drive motor 60a. A pressure sensor 63 is arranged to monitor the pressure inside the rotatable tube 23c at and/or adjacent its outlet 22. A pressure sensor 64 is arranged to monitor the pressure inside the discharge hood 22a. A temperature sensor 65 is arranged to monitor the temperature of a gas flowing, in use, from the discharge hood 22a to the synthesis gas fan 60. A pressure sensor 66 is arranged to monitor the pressure of gas flowing, in use, from the synthesis gas fan 60 to the cleaning system 6.

Referring again to FIG. 2, the apparatus comprises a residue removal system 9 arranged to receive residue from the discharge hood 22a. This residue may be sent on for further processing in a residue processing system (not shown).

The apparatus 1 further comprises a control system (not shown). The monitoring devices 40g, 40h, 40i, 40j, 40k, 40l are in wired connection to the control system. The check valves 21b, 22d are in wired communication with the control system. The pressure transmitter 29m is in wired communication with the control system. The temperature transmitters 29a, 29b, 29c, 29d, 29e, 29f, 29g, 29h, 29i, 29j, 29k, 29l are in wired communication with the control system. The variable speed drive motor 26a is in wired communication with the control system. The gas control valves 44a, 44b, 44c, 44d, 44e, 44f are in wired communication with the control system. The flow sensor 41h is in wired communication with the control system. The pressure sensor 42h is in wired communication with the control system. The temperature control valves 42aa, 42bb, 42cc, 42dd, 42ee, 42ff are in wired communication with the control system. The electric drive motor 46a is in wired communication with the control system. The air control valves 43h, 43i, 43j, 43k, 43l, 43m are in wired communication with the control system. The flow sensor 51b and flow control valve 51c are in wired communication with the control system. The variable speed electric drive motor 60a is in wired communication with the control system. The pressure control valve 62 is in wired communication with the control system. The pressure sensor 64 is in wired communication with the control system. The pressure sensor 63 is in wired communication with the control system. The temperature sensor 65 is in wired communication with the control system. The pressure sensor 66 is in wired communication with the control system.

The flow sensor 30 is in wired communication with the control system. In embodiments, one some or each of the above-described components may be in wireless communication with the control system, additionally or alternatively.

Figure 7:
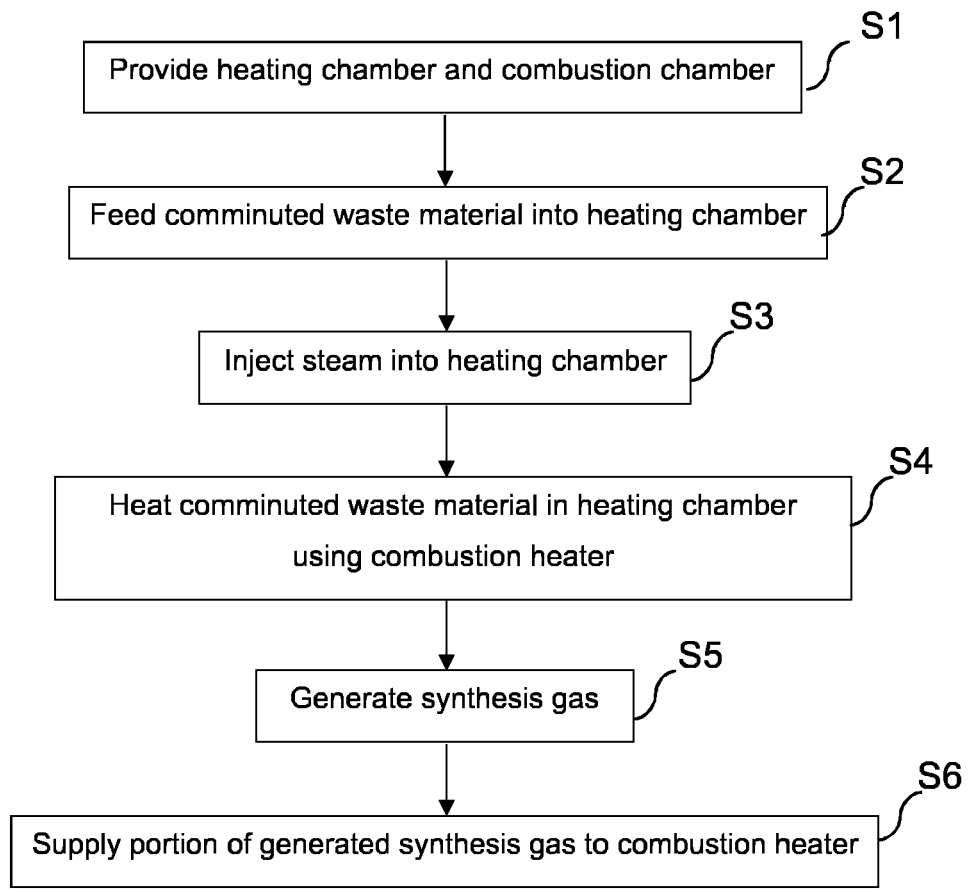
FIG. 7 shows a flow diagram of a method of treating comminuted waste material according to an embodiment of the invention.

Referring now to FIG. 7, there is shown a method of treating comminuted waste material according to an embodiment of the invention, using the apparatus shown in FIGS. 1 to 6.

In a first step S1, the apparatus 1 comprising the heating chamber 28 and the plural gas burners 40a, 40b, 40c, 40d, 40e, 40f is provided. The rotatable tube 23c is caused to rotate.

In a second step S2, comminuted waste material is fed by the feed system 3 into the rotatable tube 23c through the inlet 21 and hence into the heating chamber 28. Without wishing to be bound by any theory it is believed that the angle of incline of the indirect rotary kiln 2 encourages feed material to move along the rotatable tube 23c, e.g. by gravity feed, toward the outlet 22.

In a third step S3, steam is injected by the steam system 5 into the heating chamber 28. Steam is introduced into the rotating tube 23c through the inlet 21 by the steam pipeline 51a. The steam is superheated and is introduced into the rotating tube 23c at around 600° C.

Hot water is provided to the steam superheater 52 from the hot water source 51. The flow rate of hot water to the steam superheater 52 is monitored by the flow sensor 51b and the measurement is sent to the control system. By adjusting the flow control valve 51c, the control system can adjust the flow rate of hot water to the steam superheater 52. The hot water is heated to steam in the steam superheater 52 for introduction to the rotatable tube 23c.

Advantageously, the steam provides a reducing atmosphere for the generation of synthesis gas. Accordingly, without wishing to be bound by any particular theory, it is believed that the waste material in the heating chamber 28 is more readily and efficiently gasified into synthesis gas in the presence of steam. Furthermore, the steam acts to transfer heat directly to the waste material inside the heating chamber 28. Beneficially, the heat required from the gas burners to reach the required temperatures in the zones 28a, 28b, 28c may therefore be relatively reduced.

In a fourth step S4, the comminuted waste material in the heating chamber 28 is heated using the gas burners 40a, 40b, 40c, 40d, 40e, 40f.

As the waste material moves along the rotatable tube 23c it passes through the three zones 28a, 28b, 28c. In an embodiment, the first temperature T1 in the first zone 28a is about 700° C.; the second temperature T2 in the second zone 28b is about 900° C.; and the third temperature T3 in the third zone 28c is about 1100° C. The temperature adjacent the outlet 22 of the heating space 23d may be about 1200° C. In embodiments, however the first, second and/or third temperature T1, T2, T3 may be different.

In a fifth step S5, synthesis gas is generated in the heating chamber 28. The synthesis gas comprises a mixture of hydrogen, methane and carbon monoxide. Additional gaseous substances may also be present, for example carbon dioxide and oxygen. The ratio of hydrogen and methane in the generated synthesis gas can be adjusted by adjusting various operating factors of the apparatus 1. For example, it has been found that a relatively greater ratio of hydrogen to methane can be generated by heating to relatively higher temperatures in the second and/or third zones 28b, 28c. Such relatively higher temperatures may be in the range of 1000 to 1200° C., for example. In this way maximum hydrogen production can be achieved. Conversely, relatively lower temperatures in the second and/or third zones 28b, 28c may result in a relatively higher ratio of methane to hydrogen in the generated synthesis gas. Such relatively lower temperatures may be in the range of 850 to 950° C., for example. Under such relatively lower temperatures relatively more methane may be present in the synthesis gas which is removed from the rotatable tube 23c. This may be advantageous for sending at least a portion of the generated synthesis gas on to the gas burners for heating the heating chamber 28. Additionally, or alternatively, at least a portion of the generated synthesis gas may be sent to a generator for generating electrical energy. This electrical energy can be used to power at least part of the apparatus and/or can be sent to the electricity grid and/or to power other machinery.

Heating of the waste material in the heating chamber 28 leads to the generation of synthesis gas (which comprises a combustible gas) in the heating chamber 28, e.g. the fifth step S5.

Generated synthesis gas may have a residence time within the kiln 2 of about 10 seconds. The residence time of the generated synthesis gas can be altered by increasing or reducing the draw generated by the synthesis gas fan 60. Increasing the power to the synthesis gas fan 60 may act to relatively increase the flow of synthesis gas from the rotatable tube 23c.

In a sixth step S6, at least a portion of the generated synthesis gas is supplied from the heating chamber 28 to the plural gas burners 40a, 40b, 40c, 40d, 40e, 40f. In some embodiments, the fuel used by the plural gas burners 40a, 40b, 40c, 40d, 40e, 40f may be provided mostly or entirely by generated synthesis gas. In embodiments, the generated synthesis gas (or at least a portion thereof) may be treated prior to being supplied to the plural gas burners 40a, 40b, 40c, 40d, 40e, 40f. For example, one or more components (for example hydrogen) of the generated synthesis gas may be removed prior to supply to the plural gas burners 40a, 40b, 40c, 40d, 40e, 40f.

The time between comminuted waste material entering the rotatable tube 23c and the relevant residue being removed by the residue removal system 9 is in the range of 10 to 20 minutes.

Generated synthesis gas exits the rotatable tube 23c through the outlet 22. The synthesis gas is drawn from the rotatable tube 23c by action of the synthesis gas fan 60. The synthesis gas then enters the discharge hood 22a. The synthesis gas is then drawn from the discharge hood 22a to the cleaning system 6. Additionally, internal distributors (not shown) aid in transporting solid residues through the heating zone 28 to the discharge hood 22a. These solid residues are then removed and processed in the residue removal system 9. Additionally, advantageously, the internal distributors also introduce turbulence to the gases and steam within the heating zone 28. Without wishing to be bound by any theory it is believed that this turbulence enhances the efficiency of synthesis gas generation, for example through enhanced mixing of gasified waste material with steam. The generated synthesis gas is cleaned in the cleaning system 6. The cleaned synthesis gas is then sent to the storage system 7. At least a portion of the synthesis gas is then sent from the storage system 7 to the gas burners 40a, 40b, 40c, 40d, 40e, 40f.

Advantageously, the method and apparatus 1 described above provides a relatively more efficient system than prior art systems. For example, by utilizing synthesis gas generated by the apparatus 1 as a fuel source for the plural gas burners 40a, 40b, 40c, 40d, 40e, 40f the amount of external fuel is relatively reduced. The cost of heating the heating chamber 28 may, accordingly, be relatively reduced with respect to prior art apparatus and methods.

As will be appreciated by one skilled in the art, the various steps described above may occur simultaneously. For example, waste material may be fed into the indirect kiln 2 at the same time as previously fed waste material is being heated by the gas burners.

The pressure in the rotatable tube 23c is monitored by the pressure sensor 63. The temperature in the outlet pipe 51 is monitored by the temperature sensor 65. The control system receives the monitored pressure and temperature. If the monitored pressure is greater than a predefined threshold then the control system is configured to actuate the pressure control valve 62 to allow synthesis gas to escape from the rotatable tube 23c. A pressure increase could be caused by, for example, an incident such as a blockage in the rotatable tube 23c. If the monitored pressure is less than a predefined threshold then the control system increases the draw of the fan 60. The pressure in the rotatable tube 23c may be set to about 1 bar, e.g. atmospheric pressure.

The residue removal system 9 removes solids residue from the discharge hood 22a to be processed appropriately.

The control system may periodically provide a nitrogen purge to the inlet of the rotatable tube 23c from the first nitrogen supply 21a, by opening the check valve 21b. The control system may also provide a nitrogen purge to the discharge hood 22a from the second nitrogen supply 22c by opening the check valve 22d.

Figure 8:
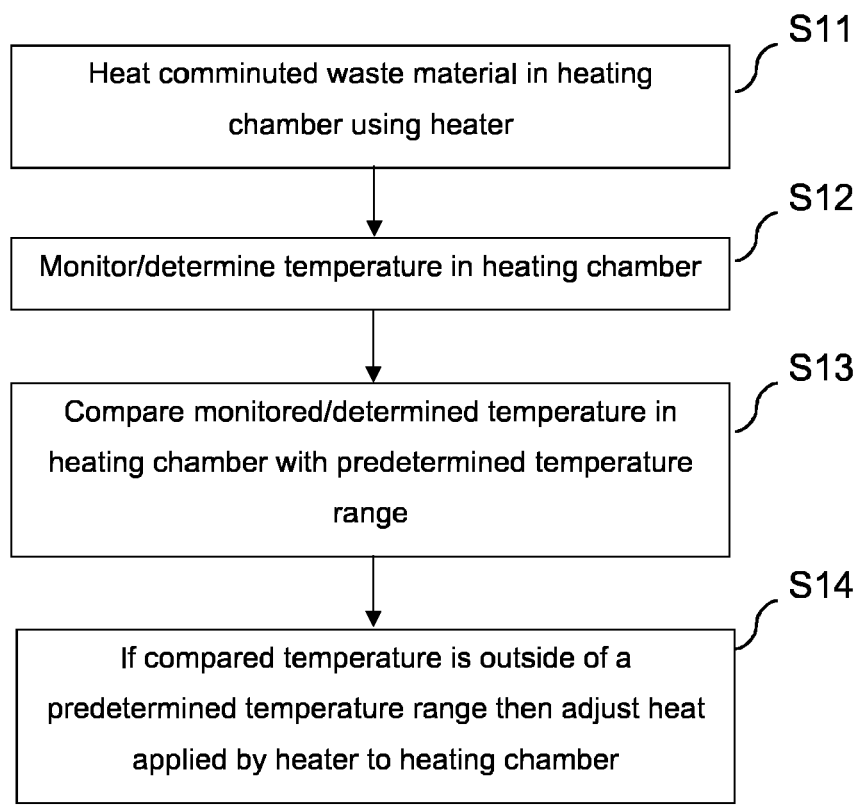
FIG. 8 shows a flow diagram of a method of treating comminuted waste material according to a further embodiment of the invention.

Referring now to FIG. 8, there is shown a method of treating comminuted waste material according to a further embodiment of the invention.

In a first step S11, comminuted waste material in the heating chamber 28 is heated using the gas burners 40a, 40b, 40c, 40d, 40e, 40f.

In a second step S12, the temperature in the heating chamber 28 is measured by the temperature sensors 29a, 29b, 29c, 29d, 29e, 29f, 29g, 29h, 29i, 29j, 29k, 29l. The measured temperature is sent to the control system. The temperature inside of the heating space 23d is measured by the temperature sensors 29g, 29h, 29i, 29j, 29k, 29l. This measured temperature is sent to the control system. As will be appreciated. the temperature in each of the zones 28a, 28b, 28c of the heating chamber 28 can be measured or determined individually. Additionally or alternatively, the temperature in the heating space adjacent each of the zones 28a, 28b, 28c can also be measured or determined individually.

Additionally, the monitoring devices 40g, 40h, 40i, 40j, 40k, 40l record the presence or absence of a flame at each gas burner 40a, 40b, 40c, 40d, 40e, 40f, respectively. The pressure sensor 42h measures the pressure of syngas in supply pipeline 42a. The flow sensor 41h measures the flow rate of natural gas through the natural gas pipeline 41.

In a third step S13, the control system compares the monitored or determined temperature in the heating chamber 28 with a predetermined temperature range. In particular, the monitored or determined temperature in the first zone 28a of the heating chamber 28 is compared with a predetermined temperature range for the first zone 28a. The monitored or determined temperature in the second zone 28b of the heating chamber 28 is compared with a predetermined temperature range for the second zone 28b. The monitored or determined temperature in the third zone 28c of the heating chamber 28 is compared with a predetermined temperature range for the third zone 28c.

Additionally, the control system uses data received from the monitoring devices 40g, 40h, 40i, 40j, 40k, 40l, the pressure sensor 42h and the flow sensor 42h to monitor the operation of the heating system 4.

In a fourth step S14, the control system adjusts the amount of heat applied by one or more of the gas burners 40a, 40b, 40c, 40d, 40e, 40f to the heating chamber 28 if the measured or determined temperature in the heating chamber is outside of the predetermined temperature range. If, for example the measured or determined temperature in the first zone 28a of the heating chamber 28 is lower than the predetermined temperature range, then the control system adjusts one or each of gas burners 40a and 40b to increase the amount of heat they are applying to the first zone 28a.

The predetermined temperature range in the first zone 28a may be between 650 and 750° C., say between 660, 670, 680 or 690 and 710, 720, 730 or 740° C. The predetermined temperature range in the second zone 28b may be between 850 and 950° C., say between 860, 870, 880 or 890 and 910, 920, 930 or 940° C. The predetermined temperature range in the third zone 28c may be between about 1050 and 1150° C., say between about 1060, 1070, 1080 or 1090 and 1110, 1120, 1130 or 1140° C. The predetermined temperature range may be altered or set dependent on the composition of the waste material (for example the waste material to be fed into the heating chamber 28).

The temperature in each of the zones 28a, 28b, 28c of the heating chamber 28 is controlled by controlling the heat applied by each of the gas burners 40a, 40b, 40c, 40d, 40e, 40f. The heat applied by each of the gas burners 40a, 40b, 40c, 40d, 40e, 40f is independently controlled by the control system. For example, the control system can increase or reduce the mass flow rate of air supplied to one, some or each of the gas burners 40a, 40b, 40c, 40d, 40e, 40f. The control system can also increase or reduce the mass flow rate of fuel to one, some or each of the gas burners 40a, 40b, 40c, 40d, 40e, 40f. The fuel may comprise a mixture of natural gas and synthesis gas. Additionally or alternatively, the control system can alter the ratio of the mixture of natural gas to synthesis gas in the fuel. Each gas control valve 44a, 44b, 44c, 44d, 44e, 44f can alter the amount of natural gas supplied to the respective gas burner 40a, 40b, 40c, 40d, 40e, 40f, or prevent any natural gas from being supplied to the respective gas burner 40a, 40b, 40c, 40d, 40e, 40f. Each gas control valve 44a, 44b, 44c, 44d, 44e, 44f can alter the amount of synthesis gas supplied to the respective gas burner 40a, 40b, 40c, 40d, 40e, 40f, or prevent any synthesis gas from being supplied to the respective gas burner 40a, 40b, 40c, 40d, 40e, 40f. In embodiments, only synthesis gas may be supplied to one, some or each of the gas burners 40a, 40b, 40c, 40d, 40e, 40f. In embodiments, only natural gas may be supplied to one, some or each of the gas burners 40a, 40b, 40c, 40d, 40e, 40f. Only natural gas may be supplied to the gas burners 40a, 40b, 40c, 40d, 40e, 40f when, for example, there is insufficient synthesis gas available. Such a situation may occur during initial start-up and running of the apparatus 1.

The temperatures in the three temperature zones 28a-c may additionally be controlled by the control system altering the rotational velocity of the rotatable tube 23c. The control system is configured to control the variable speed drive motor 26 to rotate the rotating tube 23c at the desired rotational velocity.

The combustion air fan 46 is operable (e.g. by the control system) at a constant speed or at variable speeds. The electric drive motor 46a can be controlled by the control system. Because the flow rate of combustion air to the gas burners 40a, 40b, 40c, 40d, 40e, 40f is determined by the combustion air control valves 43h, 43i, 43j, 43k, 43l, 43m, variable control of the electric drive motor 46a on the combustion air fan 46 is only provided to improve the operating efficiency of the heating system 4.

Figure 9:
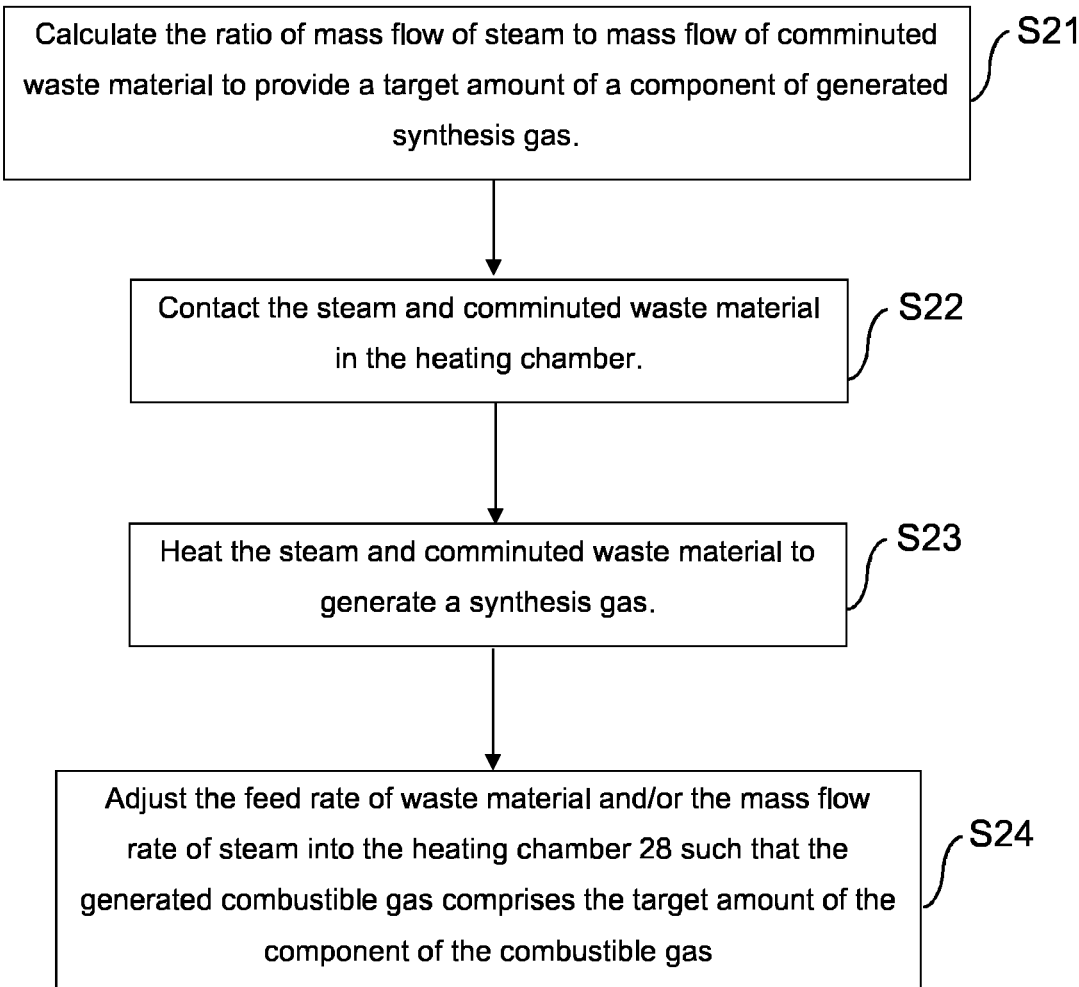
FIG. 9 shows a flow diagram of a method of treating comminuted waste material according to a further embodiment of the invention.

Referring now to FIG. 9, there is shown a method of treating comminuted waste material according to a further embodiment of the invention.

In a first, optional step S21, a ratio of mass flow of steam to mass flow of comminuted waste material is calculated. In embodiments this may be calculated by or using the control system. The ratio is calculated to provide a target amount of a component of synthesis gas generated in the heating chamber 28. In embodiments, the ratio is calculated to provide a target amount of methane or hydrogen. The ratio may be calculated based upon historical operating data. The ratio may be based upon theoretical analysis or modelled in a proprietary process modelling software. The ratio may be calculated based upon a combination of historical operating data and theoretical analysis. The ratio is calculated based upon the specific geometry and operating conditions of the indirect rotary kiln 2 and of the type and granularity of the comminuted waste material.

In a second step S22, comminuted waste material is fed into the heating chamber 28 in a manner similar to that described with respect to step S2 of the method described in respect of FIG. 7. In a third step S23, steam is introduced to the heating camber 28.

In a second step S24, the steam is contacted with the comminuted waste material, which comprises mixing, in this embodiment. Comminuted waste material is fed into the heating chamber 28 in a manner similar to that described with respect to step S2 of the method described in respect of FIG. 7. Steam is introduced to the heating camber 28. In this embodiment, mixing of steam and comminuted waste material occurs inside of the heating chamber 28. However, in embodiments, mixing (and, indeed contacting) may occur at least partially external to the heating chamber 28.

In a third step S25, the steam and comminuted waste material are heated inside the heating chamber 28 to generate a synthesis gas. This generated synthesis gas then exits the heating chamber 28 and enters the cleaning system 6 for further processing, as described above.

In a fourth step S26, the ratio of mass flow of steam to mass flow of comminuted waste material is adjusted such that the generated synthesis gas comprises the target amount of the component (e.g. methane or hydrogen) thereof, at a given temperature or temperatures in the zones 28a, 28b, 28c of the heating chamber 28.

The mass flow rate of comminuted waste material fed into the heating chamber 28 is measured or determined. In embodiments, this is accomplished by monitoring the mass of comminuted waste which is fed into the heating chamber 28 by the feed screw. This may be accomplished by measuring or determining the angular velocity of the feed screw. In embodiments, the angular velocity of the feed screw can be measured directly (for example via measurement or knowledge of the angular velocity of the motor driving the feed screw rotation) and/or can be measured indirectly (for example using an encoder).

The mass flow rate of steam into the heating chamber 28 is measured or determined by monitoring the flow of water via the flow sensor 51b, in this embodiment. In embodiments, however, any suitable means for monitoring the mass flow rate of steam into the heating chamber 28 may be used.

The feed rate of comminuted waste material into the heating chamber 28 can then be controlled by adjusting the angular velocity of the feed screw. Additionally or alternatively, the mass flow rate of steam into the heating chamber 28 can be controlled by adjusting (e.g. automatically or manually) the flow control valve 51c. In this way, the mass flow rate of comminuted waste material into the heating chamber 28 can be adjusted to reach the calculated ratio of mass flow of steam to mass flow of comminuted waste material. In this way, the target amount of the component (e.g. hydrogen or methane) of the generated synthesis gas is achieved.

As will be appreciated by one skilled in the art, the first, optional step S21 can be carried out at any time prior to or simultaneously (e.g. at least partially) any of the other steps of the method. The steps S22, S23, S24 and S25 may, in embodiments, be continuous (or substantially continuous) during the treatment of the comminuted waste material. The first, optional step S21 may be run a single time or multiple times during the treatment of the comminuted waste material. For example, a different target amount of the component of the generated synthesis gas may be set. Additionally or alternatively, a different component of the generated synthesis gas may be set. Additionally or alternatively, one or more operating characteristics of the heating chamber (e.g. one or more temperatures therewithin and/or a rate of rotation thereof) may be altered and/or the composition and/or type of the comminuted waste material (e.g. a different plastic or mixture of plastics and/or a different size or range of sizes of comminuted particles of the waste material) may be used. A new calculation, where performed, may be based on any one or more of the above-identified characteristics and/or target component amounts. In embodiments, the optional step S21 may be carried out once one or more of the other steps has already begun. In embodiments, the sixth step S26 may be carried out subsequent to the optional step S21, for example and may be based on the results from the optional step S21.

EXAMPLE

Theoretical analysis using a proprietary process modelling software was undertaken to provide calculations of the ratio of mass flow of steam to mass flow of comminuted waste necessary to provide a target amount of a component of generated synthesis gas (e.g. the optional first step S21).

In one example, the comminuted waste material was polypropylene, the operating temperature within the heating chamber 28 was set to be 1150° C. The target component was set to be methane and its target amount was set to be 35% v/v of the generated synthesis gas.

Using the theoretical analysis it was determined that the ratio of mass flow of steam to mass flow of comminuted waste material was 0.6.

It has been surprisingly found that by increasing the ratio of steam to comminuted waste material between a ratio of 0 and 0.6 results in a decrease in the amount of hydrogen (on a percentage v/v of the generated synthesis gas) generated. Increasing the ratio of steam to comminuted waste material between a ratio of 0.6 and 1, however, results in an increase in the amount of hydrogen (on a percentage v/v of the generated synthesis gas) generated.

Figure 10:
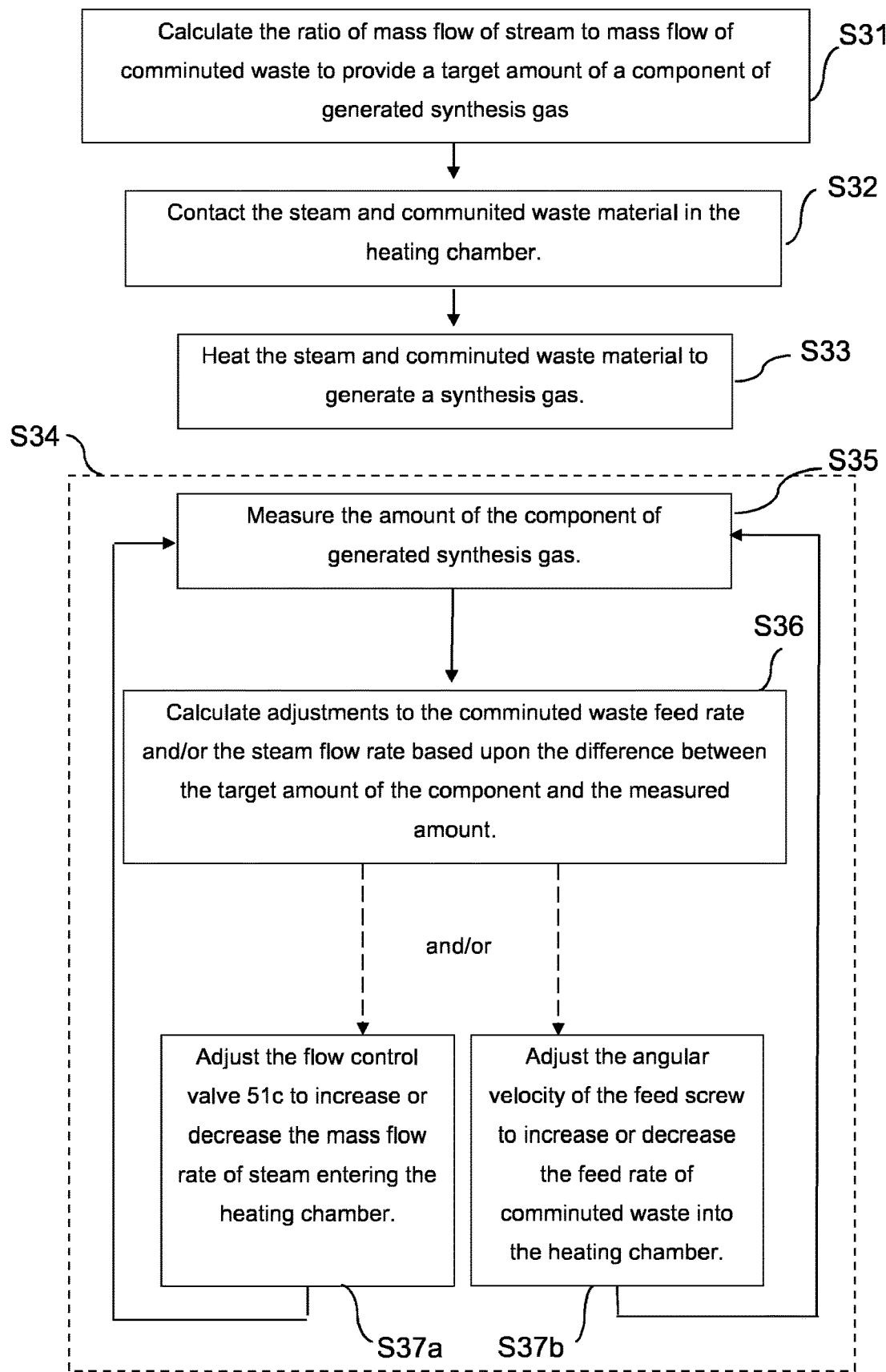
FIG. 10 shows a flow diagram of a method of treating comminuted waste material according to a further embodiment of the invention.

Referring now to FIG. 10, there is shown a method of treating comminuted waste material according to a further embodiment of the invention.

The first three steps S31, S32, S33 of the method shown in FIG. 10 are similar to the first three steps S21, S22, S23, respectively, of the method shown in FIG. 9.

The method shown in FIG. 10 includes a fourth step S34 comprising a feed-back loop (e.g. a closed loop) for controlling the amount of a component contained in generated synthesis gas.

The fourth step S34 comprises a first stage S35 of measuring the amount of the component in generated synthesis gas. This measurement may occur outside or inside the kiln 2, and/or may be achieved through use of a gas analysis means or system (not shown). The gas analysis means or system may comprise a gas chromatograph and/or may use gas chromatography and/or any other suitable technique as known to one skilled in the art. In embodiments, one or more other component of the generated synthesis gas may be measured (e.g. additionally).

In a second stage S36 the controller determines or calculates the difference between the target amount of the component of the generated synthesis gas and the measured amount of the component. If there is a difference then the controller calculates an alteration to the angular velocity of the feed screw and/or an alteration to the flow control valve 51c to, respectively, adjust the feed rate of comminuted waste material and the mass flow rate of steam into the heating chamber 28 in order to produce the target amount of the component. This calculation may be at least partially automated or may be performed by an operator.

In a third stage S37a, S37b an adjustment is made to the flow control valve 51c to increase or decrease the mass flow rate of steam entering the heating chamber and/or an adjustment is made to the angular velocity of the feed screw to increase or decrease the feed rate of comminuted waste material into the heating chamber. The adjustment(s) is/are made responsive to the calculation performed in the second stage S36. In one embodiment, only the mass flow rate of steam is adjusted. In another embodiment, only the feed rate of comminuted waste material is adjusted.

The above-described feed-back loop of the fourth step S34 provides for monitoring and control of the generated synthesis gas such that the target amount of the component is generated. Advantageously, this allows for maintaining a target amount of a component of the generated synthesis gas during operation. Further advantageously, this allows the target amount and/or the component to be changed during operation of the method. In this way, changes to end-use requirements can be more rapidly and readily met.

It will be appreciated by those skilled in the art that several variations to the aforementioned embodiments are envisaged without departing from the scope of the invention. For example, the control system may be automated or manually monitored and/or controlled. The control system may be located remotely or at the apparatus 1. Additionally or alternatively, although a natural gas source 41 is described, this could instead be another combustible fuel, such as oil or coal or the like. Additionally or alternatively, although six gas burners are shown there may instead be any suitable number, for example more or less than six. Additionally or alternatively, although a single indirect rotary kiln is shown there may instead be plural indirect rotary kilns. Where more than one indirect rotary kiln is provided there may be a heating system, steam system, supply system, etc. for each indirect rotary kiln. Alternatively, where more than one indirect rotary kiln is provided a heating system, steam system, supply system or the like may be shared between two or more indirect rotary kilns.

Additionally or alternatively, although the apparatus 1 is described as comprising an indirect rotatable kiln 2 this need not be the case and, instead, the kiln may be a direct kiln, e.g. a direct rotatable kiln.

Additionally or alternatively, whilst the comminuted waste material and the steam are described as being mixed, said mixing may be due to introduction of the comminuted waste material into contact with the steam, only. Alternatively, mixing may comprise use of a mixing means or mixer configured to aid or enhance mixing of the comminuted waste material and steam. Where provided, the mixing means or mixer may be provided inside the kiln 2, for example inside the heating chamber 28. Alternatively, the mixing means or mixer may be provided at least partially outside of the kiln 2 (e.g. at least partially outside of the heating chamber 28).

It will also be appreciated by those skilled in the art that any number of combinations of the aforementioned features and/or those shown in the appended drawings provide clear advantages over the prior art and are therefore within the scope of the invention described herein.

The invention claimed is:

1. A method of treating comminuted waste material, the method comprising:
   a) continuously feeding comminuted waste material into an inlet of a rotatable heating chamber;
   b) introducing steam into the rotatable heating chamber via a steam introducer located within said inlet;
   c) contacting the steam and comminuted waste material upon entry of the steam within said rotatable heating chamber;
   d) heating the steam and comminuted waste material to generate a continuous egress of a combustible gas at an outlet of said rotatable heating chamber; and
   e) automatically altering or controlling the ratio of steam to comminuted waste material such that the generated combustible gas comprises a target amount of a component thereof.

2. Method according to claim 1, wherein automatically altering or controlling the ratio of steam to comminuted waste material comprises adjusting the amount of steam introduced into the rotatable heating chamber.

3. Method according to claim 1, wherein automatically altering or controlling the ratio of steam to comminuted waste material comprises increasing or decreasing the amount of comminuted waste material fed into the rotatable heating chamber.

4. Method according to claim 1, comprising monitoring or determining the amount of steam introduced into the rotatable heating chamber.

5. Method according to claim 4, comprising comparing the monitored or determined amount of steam introduced into the rotatable heating chamber with a steam target.

6. Method according to claim 5, wherein automatically altering or controlling the ratio of steam to comminuted waste material comprises automatically adjusting the amount of steam introduced into the rotatable heating chamber to maintain the amount at or about or within the steam target.

7. Method according to claim 1, comprising monitoring or determining the amount of comminuted waste material fed into the rotatable heating chamber.

8. Method according to claim 7, comprising comparing the monitored or determined amount of comminuted waste material fed into the rotatable heating chamber with a waste material target.

9. Method according to claim 8, wherein automatically altering or controlling the ratio of steam to comminuted waste material comprises automatically adjusting the amount of comminuted waste material fed into the rotatable heating chamber to maintain the amount at or about or within the waste material target.

10. Method according to claim 1, wherein the component is hydrogen or methane.

11. Method according to claim 1, comprising a step f) of setting the target amount.

12. Method according to claim 1, wherein step c) occurs inside and/or at least partially outside the rotatable heating chamber.

13. A method of treating comminuted waste material, the method comprising:
   a) heating water using one or more combustion heaters to generate steam;
   b) introducing the generated steam into a steam introducer located at an inlet of a rotatable heating chamber;
   c) continuously feeding comminuted waste material into said inlet and heating the comminuted waste material upon entry of the generated steam into the rotatable heating chamber to generate a continuous egress of a combustible gas at an outlet of said rotatable heating chamber; and
   d) supplying at least a portion of the combustible gas to the one or more combustion heaters for heating the water.

14. An apparatus for treating comminuted waste material, the apparatus comprising:
   a rotatable heating chamber comprising an inlet for the continuous feeding of comminuted waste material into the rotatable heating chamber, and an outlet for continuous egress of a generated combustible gas from the rotatable heating chamber;
   a steam introduction system for introducing steam into the rotatable heating chamber, the steam introduction system comprising a steam introducer for introducing steam into the rotatable heating chamber, wherein the steam introducer is located within the inlet for continuously feeding comminuted waste material into the rotatable heating chamber, and is configured such that the steam contacts the comminuted waste material as it enters the rotatable heating chamber;

a heater for heating a mixture of steam and comminuted waste material in the rotatable heating chamber, in use, to generate a combustible gas; and a controller configured to automatically alter or control, in use, the ratio of steam to comminuted waste material in the rotatable heating chamber such that a combustible gas generated therefrom comprises a target amount of a component thereof.

15. Apparatus according to claim 14, comprising a steam sensor configured or configurable to monitor the amount of steam introduced into the rotatable heating chamber, in use.

16. Apparatus according to claim 15, wherein the controller is configured to compare an amount of steam introduced into the rotatable heating chamber, in use, measured by the steam sensor with a steam target.

17. Apparatus according to claim 16, wherein the controller is configured to automatically adjust the amount of steam introduced into the rotatable heating chamber, in use, to maintain the amount at or about or within the steam target.

18. Apparatus according to any claim 14, comprising a material sensor configured or configurable to monitor the amount of comminuted waste material fed into the rotatable heating chamber.

19. Apparatus according to claim 18, wherein the controller is configured to compare an amount of comminuted waste material fed into the rotatable heating chamber, in use, with a waste material target.

20. Apparatus according to claim 19, wherein the controller is configured to automatically adjust the amount of comminuted waste material fed into the rotatable heating chamber, in use, to maintain the amount at or about or within the waste material target.

* * * * *